Figure 1:
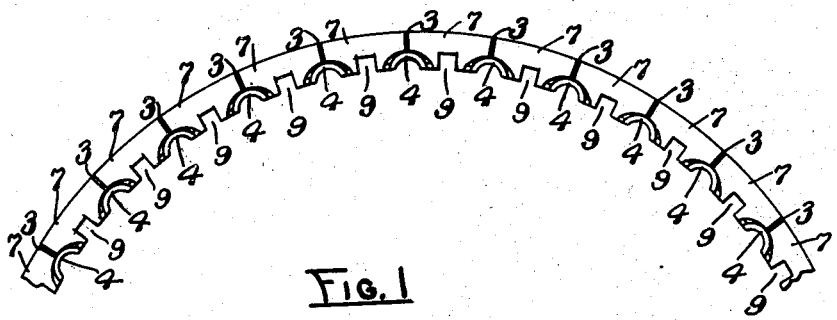

Sept. 27, 1949.  H. M. OLSON  2,482,990
PISTON RING BLANK
Filed Feb. 9, 1948  2 Sheets-Sheet 1

INVENTOR
HOLLY M. OLSON
BY Liverance and
Van Antwerp
ATTORNEYS

Sept. 27, 1949. H. M. OLSON 2,482,990
PISTON RING BLANK
Filed Feb. 9, 1948 2 Sheets-Sheet 2
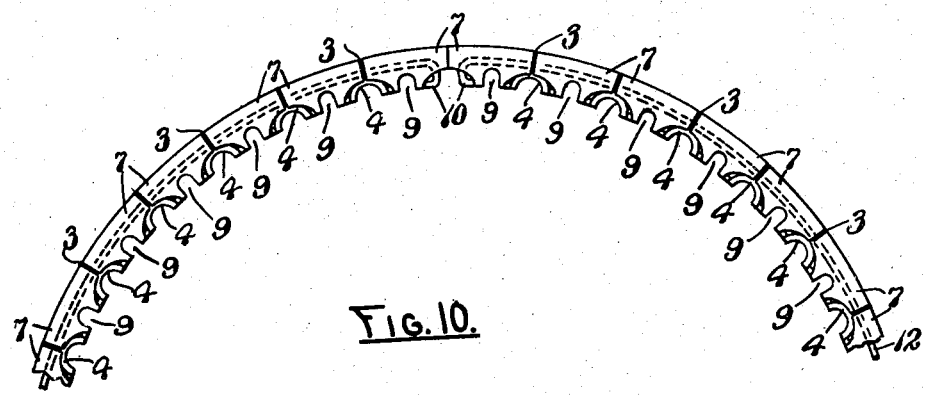
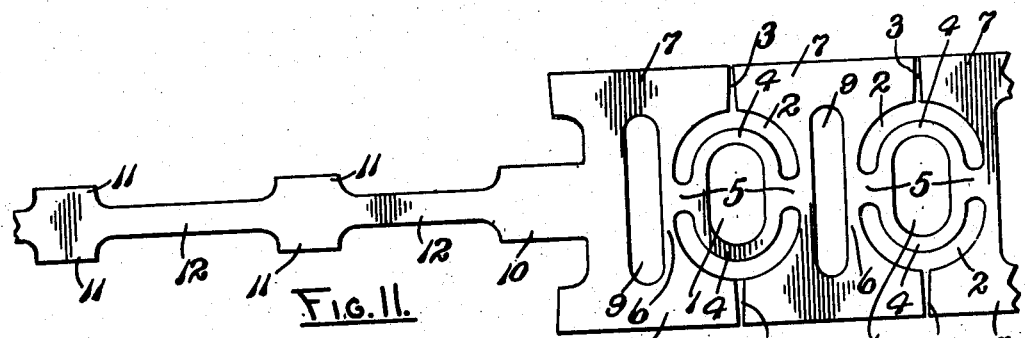
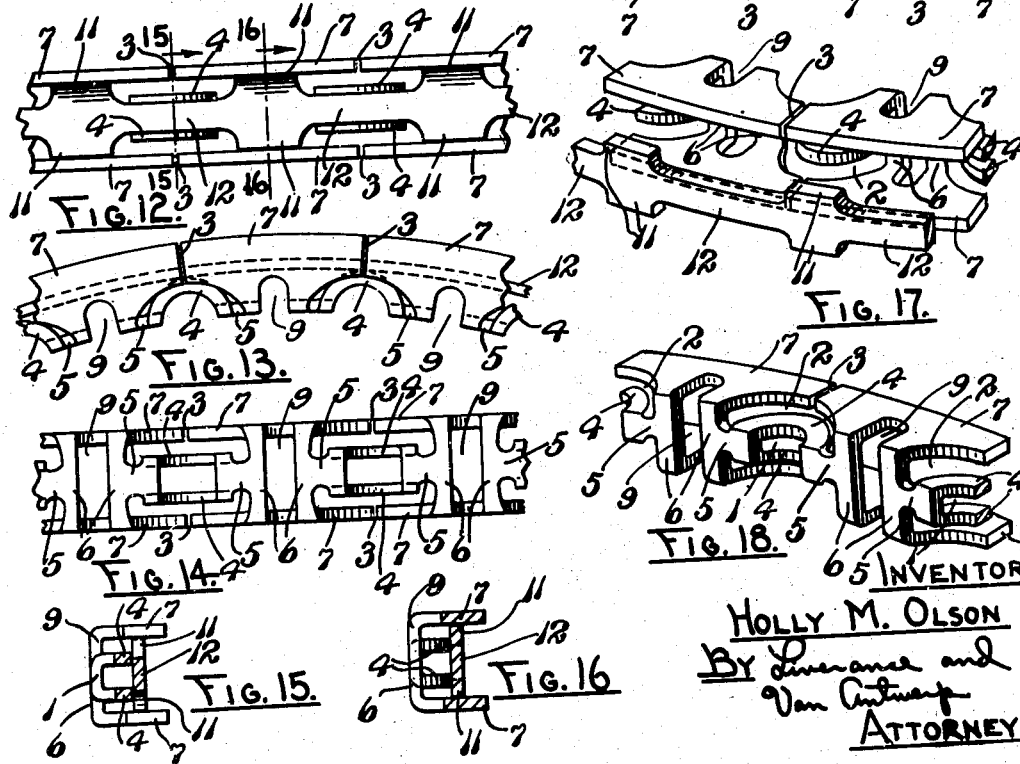

Patented Sept. 27, 1949

2,482,990

UNITED STATES PATENT OFFICE 2,482,990

PISTON RING BLANK

Holly M. Olson, Muskegon, Mich., assignor to Sealed Power Corporation, Muskegon, Mich., a corporation of Michigan Application February 9, 1948, Serial No. 7,093

4 Claims. (Cl. 29—190)

The present invention pertains to and is concerned with a self-expanding piston ring, made from one length of sheet metal with substantially no waste of material in a preferred form thereof, and having positive features for the control of oil in internal combustion engines when the ring is assembled in the lower groove of a piston or pistons therein. Such ring is circumferentially contracted when installed in the ring groove of a piston and placed within a cylinder in which the piston reciprocates, thereby producing a required pressure of the ring against a cylinder wall; and such ring is very flexible and conforms to the cylinder wall when such wall has become worn and out of round or tapered. With the ring the holding of the oil against passage beyond a piston into the combustion chamber at the outer end of the piston is substantially perfectly attained and oil saved. The smoke, carbon and other dirt which comes from excessive use and burning of oil is substantially eliminated.

It is an object and purpose of the present invention to provide a piston ring of the character outlined which, when completed, has a multiple number of sector-shaped units which conform at their outer bearing edges to the inner curved wall of a cylinder. Between each sector of the ring, the material thereof is punched and cut therefrom and removed, and the material shaped to provide flexibility in a tangential direction whereby, with the ends of a ring at the gap or parting therein abutting against each other and contracted within a cylinder wall, the ring is circumferentially compressed with the sectors at their ends in close proximity to each other, but slightly spaced to permit freedom of movement. Such ring in a short time in the operation of an engine takes a position in which the spaces between the ends of the sectors become established at a predetermined amount. Flexibility between the several sectors, or numbers of said sectors, allows free movement for the ring to conform to irregularities of the inner wall of the cylinder, thereby resulting in sealing against oil pumping and eventual passage to the engine combustion chamber at the outer end of the piston.

Furthermore, with my invention the length of flat steel or ribbon material from which a ring is made may be substantially the circumferential length of the ring, and a minimum of material for a ring used. The novel ring structure, furthermore, is of a sturdy and durable character such that it gives a long time service. The drainage of oil through the ring to the bottom of the ring groove in which installed, and from which groove it is carried to the interior of the piston and back to the engine crankcase, is ample so that closing or stopping such drainage by carbon accumulation does not occur. In addition the ring segments are individually held from axial collapse toward each other or from vibrating or fluttering during the operation.

Figure 2:
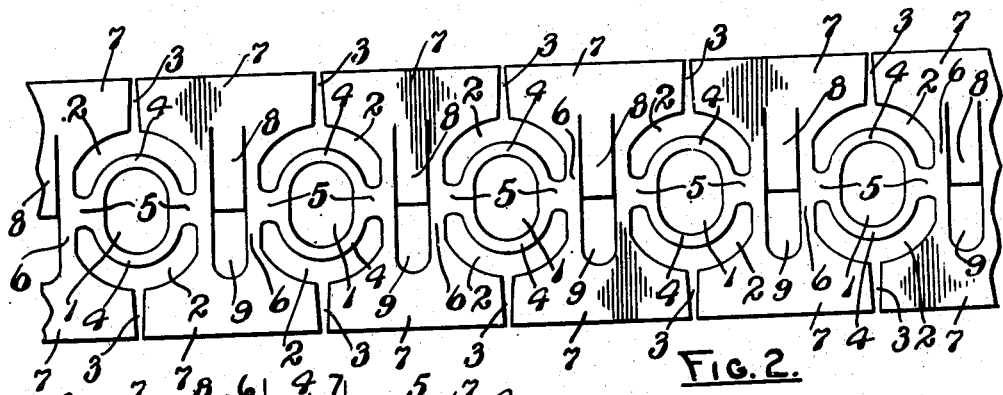
Figure 3:
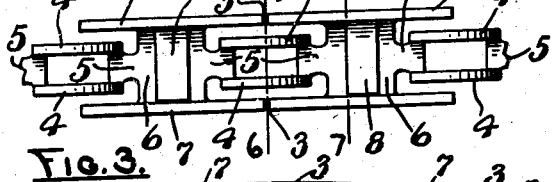
Figure 4:
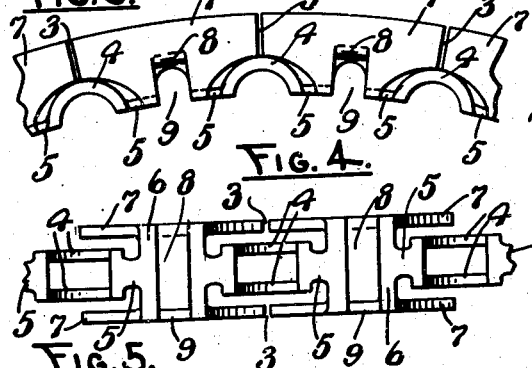
Figure 5:
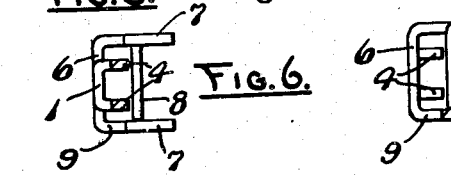
Figure 6:
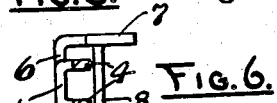
Figure 7:
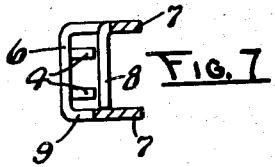

An understanding of the invention may be had from the following description, taken in connection with the accompanying drawings, in which, Fig. 1 is a fragmentary plan view of a steel piston ring made in accordance with my invention, Fig. 2 is a fragmentary enlarged plan of the blank as it is cut and punched before forming into the completed ring, Fig. 3 is a fragmentary edge view of the completed ring, looking against its outer side, Fig. 4 is a fragmentary plan thereof, Fig. 5 is a fragmentary inner elevation of the ring, Figs. 6 and 7 are transverse sections substantially on the planes of lines 6—6 and 7—7 of Fig. 3, looking in the directions indicated.

Figure 8:
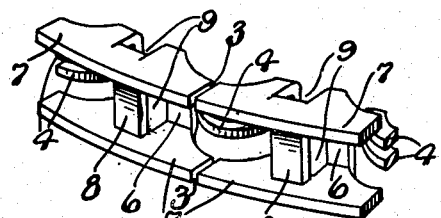
Figure 9:
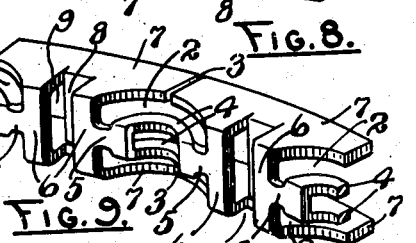

Fig. 8 is a fragmentary perspective view of the ring looking at it against its outer edges or side, Fig. 9 is a similar fragmentary perspective view looking at the inner side of the ring, Fig. 10 is a plan view, similar to Fig. 1, of a modified form of structure of the invention, Fig. 11 is a plan, similar to Fig. 2, of a fragmentary portion of a ring blank, Fig. 12 is a fragmentary elevation of the ring looking against its outer edges, Fig. 13 is a fragmentary plan view thereof, Fig. 14 is a fragmentary inner elevation of the ring, Figs. 15 and 16 are transverse sections through the ring substantially on the planes of lines 15—15 and 16—16 of Fig. 12, looking in the directions indicated, Fig. 17 is a fragmentary perspective view of the ring, looking at its outer edges or side, and with the strut flange supporting means separated outwardly therefrom, and Fig. 18 is a fragmentary perspective view, similar to Fig. 9, of the piston ring, looking at the inner side thereof, the flange's supporting member being removed.

Like reference characters refer to like parts in the different figures of the drawings.

In the production of a piston ring in accordance with my invention, a length of flat thin steel, that is a band or ribbon of the proper width is subjected to die operations to provide, in the length thereof, a plurality of openings 1, having rounded ends and which may be somewhat oblong in shape, outwardly from each end of each of which an arcuate slot 2 is cut, the ends of each pair of slots, one at each end of the opening 1, approaching each other but not meeting. From each of the arc-shaped slots 2, and midway between the ends thereof, slots 3 are cut outwardly to the outer longitudinal edges of the strip or band of flat metal used. There is thus provided between each opening 1 and the slots 2 a substantially open frame having rounded ends 4 connected by spaced sides, each of said sides at the longitudinal center line of the band of metal used having an integral connection, indicated at 5, with the sector-shaped units of the ring. Such sector-shaped units include an inner narrower section 6, which at each end progressively widens into a sector flange 7, adjacent ends of the sector flanges 7 being separated by the slots 3. The slots 3 are somewhat wider at their inner than at their outer ends, and progressively decrease in width outwardly.

In the form of the invention shown in Figs. 1 to 9 inclusive, the narrowed section 6 previously mentioned is punched and cut from the metal to make an opening 9 and a tongue 8, which at its outer end is integral with the metal band but separated at its sides, as shown. The outer end of each opening 9 and the outer end of each tongue 8 are located substantially equal distances from the middle center line of the band, so that when the tongue 8 is later bent to form a supporting and reinforcing strut for the spaced flanges 7 of the sector-like units, the opening provided by thus bending and displaying a tongue 8 with its connected opening 9 is an opening extending across the middle center line of the metal band used and located substantially symmetrical with respect thereto.

In the shaping of the piston ring from the flat metal band, after it has been processed as described, the wider flange portions 7 are bent from their narrower connecting sections 6 in the same direction at right angles thereto to provide spaced ring flanges which are disposed in spaced apart horizontal planes when the ring is applied to a vertical piston in an internal combustion engine. In other engines, as horizontal, or with the cylinders located in a V-angle relative to each other, said flanges may not be horizontal but take other planes, but the two spaced apart series of flanges are in parallel planes and those at one side of the ring are against one side of the piston ring groove in which installed, and those at the other side of the ring against the other side of the groove. The rounded or generally semi-circular ends 4, one at each end of each opening 1, are also bent at right angles to their connecting sides and in the same direction that the flanges 7 are bent, and the tongues 8 are bent from the flanges 7 to which connected at right angles thereto, their free ends coming in substantial contact with the inner side of the opposed spaced apart sector flange 7, as best shown in Fig. 8.

With the ring as thus constructed, the inwardly bent semi-circular loops which are provided by the parts 4 (Figs. 1 and 4), provide flexible spring connections between the several sector units, each of which sector units consist of the spaced apart flanges 7 and the connecting sections 6 between them. The ring is thereupon circumferentially compressible with a straining of the spring loops 4 and the building up of forces in such loops 4 tending to expand the ring circumferentially. Thus, when it is in a ring groove of a piston and circumferentially compressed within a cylinder wall, the outer edges of the flanges 7 of the sector units bear with a pressure force against the bore or inner wall of the cylinder. The struts 8 maintain the flanges 7 of each of said sector units against movement of the same toward each other. When the ring is in a ring groove of a piston the side walls of the ring groove hold the flanges from movement outwardly and further separating from each other, so that said flanges are held against vibration, fluttering or the like.

It is also evident that the openings made through the ring at the slots 9, and the continuations thereof formed by bending the tongues 8 in the manner described, also the openings between the loops 4 and between said loops and the sector flanges 7, provide a maximum ventilation for free passage of oil which may be scraped from a cylinder wall and directed into the groove around the ring between the ring flanges 7. Such oil passing to the piston of the ring groove is drained away in the usual manner. It is of course understood that upon shaping the ring to its generally circular form, the sides of the slots 3 become substantially parallel to each other and the slots are radial. The outer bearing edges of the sectors 7 may be ground or otherwise machined to an arc which is an arc of a circle having a radius substantially equal to the radius of the bore of the cylinder in which the ring is used.

In Figs. 10 to 18 inclusive, the tongues 8 are wholly removed, thereby leaving transverse slots 9 closed at both ends, which will be substantially the same as the slots in the previously described ring when the tongues 8 have been bent at right angles to the flanges 7 to which integrally connected. At each end of the band from which the ring is made, a centrally disposed narrow band 10 extends therefrom, which has spaced lengths thereof at each side removed, leaving projecting tongues 11 with intermediate connecting narrower bands 12 between the spaced projections 11. Each of these narrow integrally connected lengths of flat metal, one at each end of the wider band, are very closely to one-half of the length of the wider metal band. Each at its integral connection of its inner end to each end of the wider band, after the ring has been shaped and formed the same as the first described ring, is bent back upon and at the outer side of the formed ring to lie between the sector flanges 7. The distance from the outer edge of a projection 11 to the outer edge of its directly opposed projection is such that said projections come closely within the inner sides of the opposed flanges 7 of the sector-like units. This provides strut supports for the flanges of each of said sector units, serving the same purpose as the strut tongues 8 previously described. Otherwise the ring structure is the same and has the same advantages.

It it of course apparent that the openings 1 may be of varying widths and lengths, those shown in Fig. 11 being of a greater length and a narrower width than those in Fig. 2. It is also apparent that the loops 4, which are provided by bending the rounded generally semi-circular ends of the frame around each of the openings 1, may be bent at different distances outwardly from the middle longitudinal line of the band from which the ring is made, for obtaining varying or differing circumferential compressions and ring tensions. In the form of the ring shown in Figs. 1 to 9 inclusive, a minimum of material is used, the metal band from which a ring is made being substantially, if not exactly, the length of the circumference of the ring completed therefrom. The flexibility of the ring so that a sector or a number of sectors at any part of the length thereof may flex and move to follow an imperfect cylinder wall is apparent. The novel structure of ring is one which is easily manufactured at low cost.

The invention is defined in the appended claims and is to be considered comprehensive of all forms of structure coming within their scope.

I claim:

1. A piston ring blank comprising, an elongated band of flat metal having openings spaced from each other in the length thereof and centrally between the side edges and having arcuate slots spaced one at each side from each opening transversely of the band, adjacent ends of the slots associated with each opening being spaced from each other, and said band, substantially midway between the ends of each of said slots, having slots connecting therewith extending outwardly to the side edges of said band.

2. A structure as defined in claim 1, said band between spaced openings and the slots associated with each of said openings having transverse slots closed at both ends and located symmetrically with respect to the longitudinal center line of the band.

3. A structure as defined in claim 1, said band between the outwardly extending slots being bent longitudinally parallel to and at each side of its longitudinal center line in the same direction to provide spaced apart parallel sector flanges, and said band between each of the central openings therethrough and associated arcuate slots spaced from the sides thereof having the portions therebetween turned in the same direction substantially at right angles to the length of the band.

4. A structure as defined in claim 3, and a length of flat metal slightly narrower in width than the distance between the inner sides of said parallel flanges located therebetween, and at spaced apart intervals having narrowed sections connecting wider sections, said wider sections being located between successive parallel spaced flanges, and the narrower sections bridging across the slots between the ends of successive flanges.

HOLLY M. OLSON.

REFERENCES CITED

The following references are of record in the file of this patent:

UNITED STATES PATENTS

| Number | Name | Date |
| --- | --- | --- |
| 1,719,847 | Morse | July 9, 1929 |
| 1,734,356 | Welch | Nov. 5, 1929 |
| 1,783,886 | McFall | Dec. 2, 1930 |
| 2,311,729 | Bowers | Feb. 23, 1943 |
| 2,334,456 | Thorp | Nov. 16, 1943 |
| 2,397,636 | Zahodiakin | Apr. 2, 1946 |
| 2,409,966 | Voity | Oct. 22, 1946 |
| 2,421,175 | Zahodiakin | May 27, 1947 |
| 2,432,602 | Zahodiakin | Dec. 16, 1947 |